April 11, 1961 A. W. BRODEN 2,978,931
DRILL STOP
Filed Sept. 9, 1959
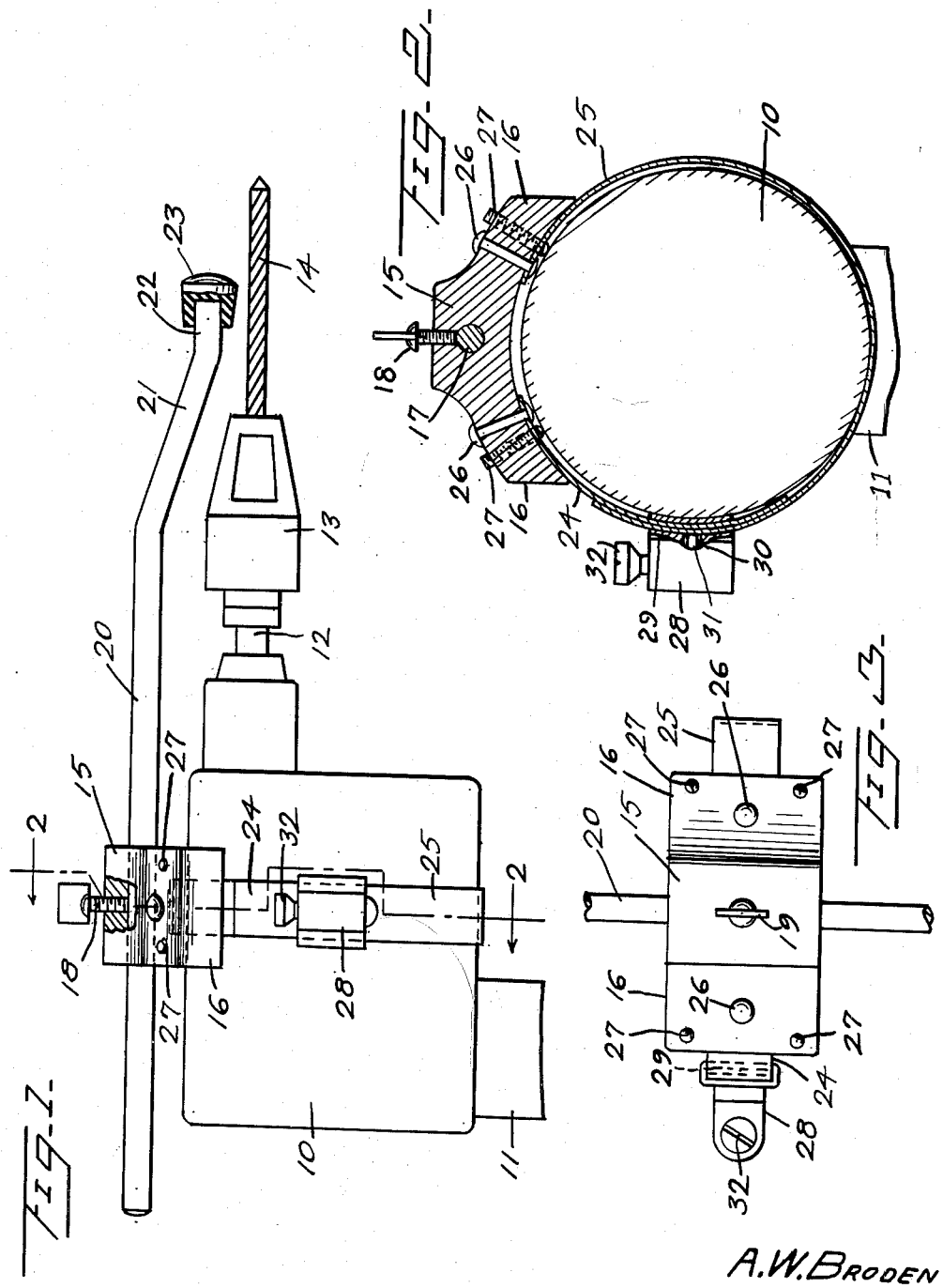
A.W. BRODEN
INVENTOR
BY C.A.Snow&Co.
ATTORNEYS.

United States Patent Office 2,978,931
Patented Apr. 11, 1961

2,978,931

DRILL STOP

Albert W. Broden, 6621 Elliot Ave., Minneapolis, Minn.

Filed Sept. 9, 1959, Ser. No. 838,928

3 Claims. (Cl. 77—7)

This invention relates to a drill stop for determining the depth of holes drilled by an electric hand drill.

Heretofore the drilling of holes to any desired depth by an electric hand drill has been a matter solely within the judgment of the operator. The result has been that the holes are not uniform as to depth.

The object of the present invention is to provide a stop that will limit a hole drilled by an electric hand drill to the desired depth.

Another object of the present invention is to provide a drill stop which may be used on existing electric hand drills, without any modification of the structure of the latter.

A further object of the present invention is to provide a drill stop which may be readily attached to and detached from existing electric hand drills.

Still further objects, advantages and improvements will become apparent from the following specification taken in connection with the accompanying drawing, in which:

Figure 1 is a side elevational view showing the drill stop according to the present invention, attached to an electric hand drill.

Fig. 2 is a sectional view, taken on the section line 2—2 of Fig. 1 and looking in the direction of the arrows.

Fig. 3 is a top plan view of the mounting of the drill stop, according to the present invention.

Referring now to the drawing in detail, and to Fig. 1 in particular, a conventional electric hand drill is shown here, same having a motor casing 10, a handle 11, a shaft 12, a chuck 13, the latter mounting a drill bit 14. The mounting for the stop is comprised by a saddle 15 having oppositely extending and arcuately shaped legs 16—16. A longitudinally positioned hole 17 is formed through the saddle and this hole receives the stop rod. The latter is comprised by a longitudinally extending section 20, a bent section 21 and an end 22.

The bent section 21 of the stop rod conforms to the taper of the chuck 13 and its function is to bring the end 22 in close proximity to and parallel relationship with the drill bit 14. The end 22 of the stop rod carries a bumper 23, of hard rubber or other suitable material, which is adapted to abut the work piece being drilled. A set screw 18 having a suitable wing 19 thereon is mounted in a screw threaded hole, which intersects the longitudinally positioned hole 17 through the saddle, and serves to hold the stop rod in the selected positions.

An attachment band is formed in two sections 24 and 25, which are secured respectively at one end to the arcuate inner surfaces of the oppositely extending legs 16—16 of the saddle by rivets 26.

A clamp is provided for securing the two sections 24 and 25 of the band together in such manner as to accommodate the drill stop to the different diameters of motor casings. This clamp is comprised principally by a body 28 having a longitudinally extending slot 29 therethrough adjacent one side, which receives the overlapped ends of the band sections 24 and 25. The body 28 has another slot 30 therethrough, at right angles to the slot 29, and a cam 31 is positioned in this latter slot. The cam 31 is mounted on a screw 32, which extends through a suitable hole (not shown) in the body 28. Partial rotation of the screw 32 in one direction will force the end of the band section 25 to grip the end of the band section 24 and the latter to grip the bottom of the slot 29 in the body 28; partial rotation of the screw 32 in the opposite direction will release the end of the band section 25 from the end of the band section 24 and the latter from the bottom of the slot 29.

A means is provided for centering the saddle 15 on the motor casing 10 of the hand drill, after the band has been placed around the motor casing, but before the clamp 28 has been operated to close the band sections 24 and 25 on each other. The means is comprised by set screws 27 positioned in suitable screw threaded holes in the oppositely extending legs 16—16 of the saddle. Two of the set screws 27 are provided in each leg 16 of the saddle and positioned along a line parallel to the hole 17 in the saddle, through which the stop rod 20 extends.

It will now be apparent that the drill stop according to the present invention may be placed around the motor casing 10 of a conventional electric drill by suitable manipulation of the two part adjustable band 24—25, the set screws 27 and the clamp 28. The drill stop rod 20 may be set in the desired position by sliding it through the hole 17 in the saddle 15 and then tightening the wing screw 18. The desired position of the drill stop rod may be easily determined, for instance by holding a piece of flat material over the point of the drill bit 14, and at right angles to the axis of the latter, and a scale between the piece of flat material and the bumper 23 on the drill stop rod. For drilling entirely through the work piece, either the entire drill stop assembly may be removed by loosening the band sections 24 and 25 from each other by the clamp 28 and sliding the band sections 24 and 25, saddle 15 and the drill rod 20 off its motor casing 10 as a unit, or the drill stop rod 20 may be removed from the saddle 15 by loosening the wing screw 18 and sliding the drill stop rod along the saddle 15.

Having now fully described my invention, what I claim as new and useful and desire to secure by Letters Patent of the United States is:

1. A depth gauge for a portable electrical drill having a substantially cylindrical housing, a driving shaft, and a chuck mounted on the driving shaft adapted to carry a drill bit, said depth gauge including a saddle having an arcuate bottom surface adapted to fit the housing of the electrical drill and a hole extending lengthwise therethrough, a stop rod positioned in the hole in the saddle so as to extend in parallel relation to the driving shaft, chuck and drill bit carried by the latter, a band in two sections adapted to be positioned around the cylindrical housing of the drill with the sections connected at one end to the saddle on the opposite sides of the latter, a clamp adjustably connecting the other ends of the sections of the band, and arcuately spaced adjustment screws positioned on the opposite sides of and symmetrically with respect to the stop rod extending through the saddle for abutting the cylindrical housing of the drill.

2. A depth gauge for a portable electrical drill having a substantially cylindrical housing, a driving shaft and a chuck on the driving shaft adapted to carry a drill bit, said depth gauge including a saddle having an arcuate bottom surface adapted to fit the cylindrical housing of the drill and a hole extending lengthwise therethrough, a stop rod positioned in the hole in the saddle so as to extend in parallel relation to the driving shaft, chuck and drill bit carried by the latter, a band in two sections adapted to be positioned around the cylindrical housing of the drill with the sections connected at one end to the saddle on the opposite sides of the latter, a clamp adjustably connecting the other ends of the sections of the band, and adjustment screws positioned on a line parallel to the stop rod and on the opposite sides of the ends of the sections of the band and symmetrically with respect to the latter for abutting the cylindrical housing of the drill.

3. A depth gauge for a portable electrical drill having a substantially cylindrical housing, a driving shaft, a chuck on the driving shaft adapted to carry a drill bit, said depth gauge including a saddle having an arcuate bottom surface adapted to fit the cylindrical housing of the drill, a stop rod positioned in the hole in the saddle so as to extend in parallel relation to the driving shaft, a chuck and drill bit carried by the latter, a band in two sections adapted to be positioned around the cylindrical housing of the drill with the sections connected at one end to the saddle on the opposite sides of the latter, a clamp adjustably connecting the other ends of the sections of the band, and adjustment screws longitudinally aligned on the opposite sides of the stop rod and positioned symmetrically with respect to the latter and transversely aligned on the opposite sides of the ends of the band sections and abutting the cylindrical housing of the drill.

References Cited in the file of this patent

UNITED STATES PATENTS

| | | |
|---|---|---|
| 974,239 | Dalton | Nov. 1, 1910 |
| 1,929,585 | Henry | Oct. 10, 1933 |
| 2,670,638 | Roy | Mar. 2, 1954 |